United States Patent
Stevens

(10) Patent No.: US 12,537,337 B2
(45) Date of Patent: Jan. 27, 2026

(54) ELECTRIC VEHICLE CHARGING UNIT

(71) Applicant: Alternative Sustainability IP LLC, Fleming Island, FL (US)

(72) Inventor: John A. Stevens, New York, NY (US)

(73) Assignee: Alternative Sustainability IP LLC, Fleming Island, FL (US)

( * ) Notice: Subject to any disclaimer, the term of this patent is extended or adjusted under 35 U.S.C. 154(b) by 784 days.

(21) Appl. No.: 17/812,919

(22) Filed: Jul. 15, 2022

(65) Prior Publication Data
US 2023/0022422 A1 Jan. 26, 2023

Related U.S. Application Data

(60) Provisional application No. 63/203,281, filed on Jul. 15, 2021.

(51) Int. Cl.
| | |
|---|---|
| *B60L 8/00* | (2006.01) |
| *B60L 53/14* | (2019.01) |
| *B60L 53/30* | (2019.01) |
| *B60L 53/66* | (2019.01) |
| *H01R 13/533* | (2006.01) |
| *B60L 53/22* | (2019.01) |

(52) U.S. Cl.
CPC ............ *H01R 13/533* (2013.01); *B60L 53/14* (2019.02); *B60L 53/305* (2019.02); *B60L 53/66* (2019.02); *B60L 53/22* (2019.02); *H01R 2201/26* (2013.01)

(58) Field of Classification Search
CPC ..... H01R 2201/26; B60L 8/006; B60L 53/14; B60L 53/22; B60L 53/66; Y02T 10/70; Y02T 10/7072
USPC .......................................................... 320/109
See application file for complete search history.

(56) References Cited

U.S. PATENT DOCUMENTS

| | | | | |
|---|---|---|---|---|
| 5,680,032 | A * | 10/1997 | Pena | B60L 50/30 290/55 |
| 2006/0097673 | A1* | 5/2006 | Jun | H02M 7/48 318/139 |
| 2010/0204865 | A1* | 8/2010 | Nakamura | B60L 1/003 348/148 |
| 2013/0175974 | A1* | 7/2013 | Bassham | B60L 58/15 320/109 |

* cited by examiner

*Primary Examiner* — David V Henze-Gongola
*Assistant Examiner* — Ryu-Sung P. Weinmann

(57) ABSTRACT

An electric vehicle charging unit is disclosed. The electric vehicle charging unit uses a specially configured housing and a turbine to charge the batteries of a vehicle when attached to such vehicle. In particular, the electric vehicle charging unit preferably uses the housing to channel air flow, during operation of the vehicle, into the turbine to generate power, which can be used to charge one or more batteries of the vehicle.

14 Claims, 6 Drawing Sheets

ELECTRIC VEHICLE CHARGING UNIT

CLAIM OF PRIORITY

This application claims priority to U.S. Provisional Patent Application No. 63/203,281, filed Jul. 15, 2021, entitled "Electric Vehicle Charging Unit", the contents of which are hereby incorporated by reference in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present disclosure relates generally to an electric vehicle charging unit. More particularly, the present disclosure relates to a charging unit that utilizes a turbine and a specially configured housing to charge the batteries of a vehicle when attached to said vehicle.

BACKGROUND

In recent years, electric vehicles have become an increasingly popular choice of transportation, whether in the form of personal vehicles for consumers, or larger mass transit vehicles for municipalities. The advantages of electric vehicles are numerous, including purported benefits to the environment, and various tax incentives that have been introduced to help develop the electric vehicle industry.

However, electric vehicles also have specific disadvantages, as compared to internal combustion engine-based vehicles, that manufacturers have had to navigate around in order to bring viable vehicles to market. Although many of the disadvantages of previous generations of electric vehicles have been mitigated or removed, some disadvantages of electric vehicles continue to persist.

Amongst others, two specific disadvantages are relevant here. First, electric vehicles lack driving range as compared to traditional internal combustion engine vehicles. This is due to deficiencies in the battery technology currently used in electric vehicles. Specifically, the batteries used in electric vehicles are significantly less energy dense than gasoline—for example, it is well known that lithium-ion batteries are between 50-100 times less energy dense than gasoline. Due to practical limits on the weight of a car, it is thus difficult for most electric vehicles to carry a sufficient amount of batteries to provide driving range comparable to that of an internal combustion vehicle. Further, batteries, especially of the quality and quantity needed to power a vehicle, are also expensive. As a result, many electric vehicles on the market have significantly less range than traditional internal combustion engine-based vehicles.

Second, electric vehicles take a significant amount of time to recharge after the energy in the batteries has been exhausted. For example, a typical 7 kW home "fast" charger only provides 30 miles or less of driving range per hour charged. Therefore, even trips of moderate distances may result in hours of charging before the vehicle may be used again. This is far slower compared to the convenience and speed of refilling an internal combustion engine vehicle with gasoline.

The invention of the present disclosure solves this problem by providing for a novel electric vehicle charging unit. The invention of the present disclosure charges the battery of a vehicle while the vehicle is in use, thus reducing charging time while the vehicle is not in operation, and increasing vehicle range, amongst numerous other benefits. To aid in the generation of electricity, the invention also provides a specially designed housing that helps provide a constant flow of high-velocity air through the turbine.

In the present disclosure, where a document, act, or item of knowledge is referred to or discussed, this reference or discussion is not an admission that the document, act, item of knowledge, or any combination thereof that was known at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed. It is contemplated that the claims may encompass one or more of the conventional technical aspects discussed herein.

SUMMARY OF THE INVENTION

The present disclosure provides for an electric vehicle charging unit, including a turbine preferably having a receiving end, an exhaust, and a rotational means for generating electricity. In some embodiments, the electric vehicle charging unit includes a housing preferably having a first opening with a first size and a second opening with a second size, the housing more preferably being configured to direct airflow into the receiving end of the turbine. Preferably, the turbine is situated within the housing. In an embodiment, the housing is configured to be in communication with a surface of a vehicle, such that when the housing is in communication with the surface of the vehicle, the turbine is in electronic communication with the electrical system of the vehicle.

In an embodiment, the first size of the housing is larger than the second size of the housing. In an exemplary embodiment, the housing is shaped to be a trapezoidal prism.

In an embodiment, the electric vehicle charging unit includes a controller. In an embodiment, the controller is in direct electronic communication with the turbine and is configured to smooth electrical output from the turbine. In an embodiment, the electric vehicle charging unit includes an inverter. Preferably, the inverter is in direct electronic communication with an electrical charging port of the vehicle. In an exemplary embodiment, the electric vehicle charging unit includes a combination inverter and controller. Preferably, the combination inverter and controller is in direct electronic communication with the turbine and with an electrical charging port of the vehicle, and is configured to smooth electrical output from the turbine.

In an embodiment, the electric vehicle charging unit includes a charge controller and a system control panel. In an embodiment, the charge controller disconnects the electronic communication between the vehicle and the electrical vehicle charging unit when the vehicle is not in operation and disables a plug-in charging function of the electrical charging port of the vehicle when the vehicle is in operation.

In an embodiment, the system control panel displays information regarding the electrical vehicle charging unit, including electrical output and whether the electrical vehicle charging unit is in electronic communication with the vehicle.

The present disclosure of the invention also provides for an electric vehicle charging unit, including a plurality of turbines, preferably where the plurality of turbines are electronically connected in series. In some embodiments, each turbine has a receiving end, an exhaust, and a rotational means for generating electricity. In some embodiments, the electric vehicle charging unit includes a housing preferably having a first opening with a first size and a second opening with a second size. In some embodiments, the housing is configured to direct airflow into the receiving end of each of the plurality of turbines. Preferably, the plurality of turbines is situated within the housing. In an embodiment, the housing is configured to be in communication with a surface of a vehicle, such that when the housing is in communication with the surface of the vehicle, the plurality of turbines is in electronic communication with the electrical system of the vehicle.

The present disclosure of the invention also provides for an electric vehicle charging unit, including one or more turbines each preferably having a receiving end, an exhaust, and a rotational means for generating electricity. In some embodiments, the electric vehicle charging unit includes a housing preferably having a first opening with a first size and a second opening with a second size. In some embodiments, the housing is configured to direct airflow into the receiving end of the turbine.

Preferably, the turbine is situated within the housing. In some embodiments, the housing is configured to be integrated or contained within a body of a vehicle. In some embodiments, the turbine is in electronic communication with the electrical system of the vehicle.

BRIEF DESCRIPTION OF THE PREFERRED EMBODIMENTS

In the drawings, like elements are depicted by like reference numerals. The drawings are briefly described as follows.

Figure 1:
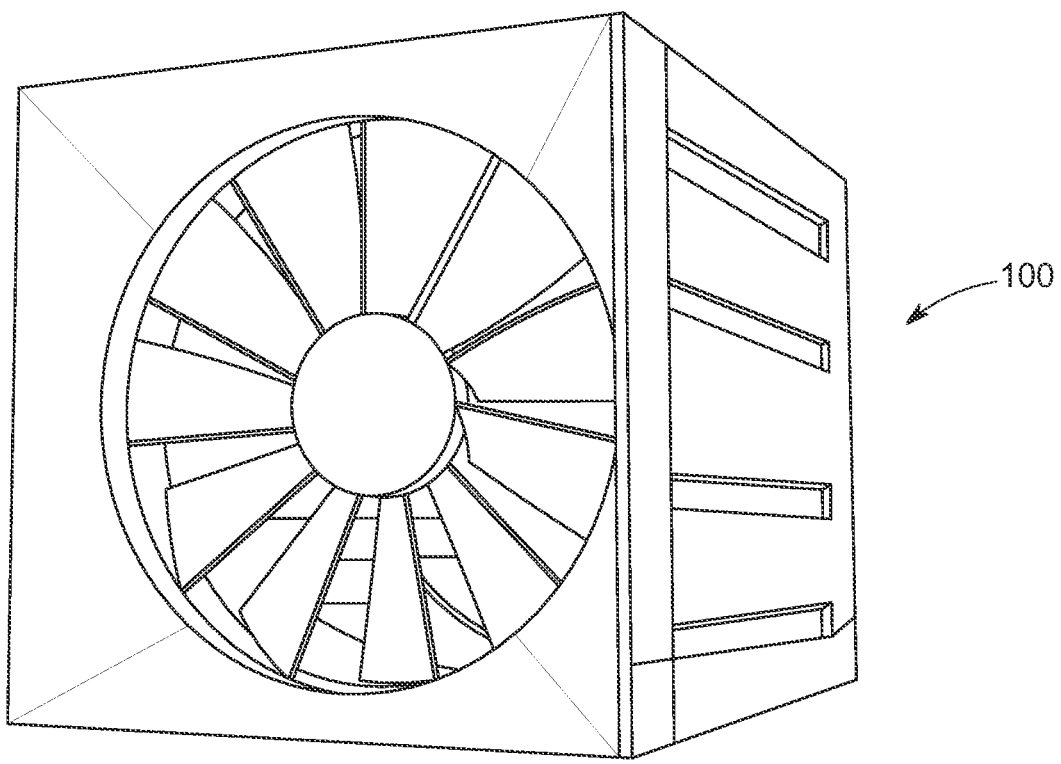
FIG. 1 is a perspective view, showing an example embodiment of the turbine according to the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto in any manner whatsoever. In fact, those of ordinary skill in the art may appreciate upon reading the present specification and viewing the present drawings that various modifications and variations can be made thereto.

For purposes of the present disclosure of the invention, unless specifically disclaimed, the singular includes the plural and vice-versa, the words "and" and "or" shall be both conjunctive and disjunctive, the words "any" and "all" shall both mean "any and all".

An embodiment of the present invention includes a turbine 100, with reference to FIG. 1, comprising a receiving end, an exhaust, a plurality of blades, and a rotor. The plurality of blades may be comprised of a number of blades that, preferably, each extend radially from the rotor, such that the plurality of blades are perpendicular or roughly perpendicular to the fluid flowing through the housing 200. However, there are alternate embodiments where each of the plurality of blades extend radially and outward from the rotor. In an exemplary embodiment, the turbine 100 is the MicroCube® produced by American Wind, Inc., and as disclosed in U.S. Pat. No. 9,331,534, the entirety of which is hereby incorporated by reference. In some embodiments, the turbine 100 may be configured according to the disclosures in U.S. patent application Ser. No. 17/495,536, filed Oct. 6, 2021, the entirety of which is hereby incorporated by reference.

Preferably each of the plurality of blades are spaced equally from each other. In alternative embodiments, either the rotor, the turbine, the plurality of blades, or the housing, may be angled such that the plurality of blades are facing an incoming fluid at a non-perpendicular angle. In this embodiment, the plurality of blades would not be exactly perpendicular to the incoming fluid. Further, in this embodiment, the angle of the plurality of blades in relation to the incoming fluid may be adjustable.

Further, a mesh screen or other filter may be disposed such that the mesh screen or other filters completely or partially covers the receiving end of the. Such a mesh screen or other filter may act to obstruct particles or debris that would otherwise damage the turbine 100.

Alternatively, the turbine 100 may contain more than one set of a plurality of blades. In such an embodiment, the more than one set of a plurality of blades may be disposed such that one set of a plurality of blades is behind the other. Preferably, in such an embodiment, each plurality of blades would be oriented at the same angle. However, there are further alternate embodiments that may benefit from more than one plurality blades such that each plurality of blades is situated at different angles.

In exemplary embodiments, the turbine 100 further comprises a generator housed within the turbine. In this exemplary embodiment, the generator would be initiated by a rotating shaft connected to the plurality of blades. This would cause the generator to produce electricity. However, in other embodiments, the turbine 100 further comprises any rotational means for producing electricity, as known in the field of wind power.

Figure 3:
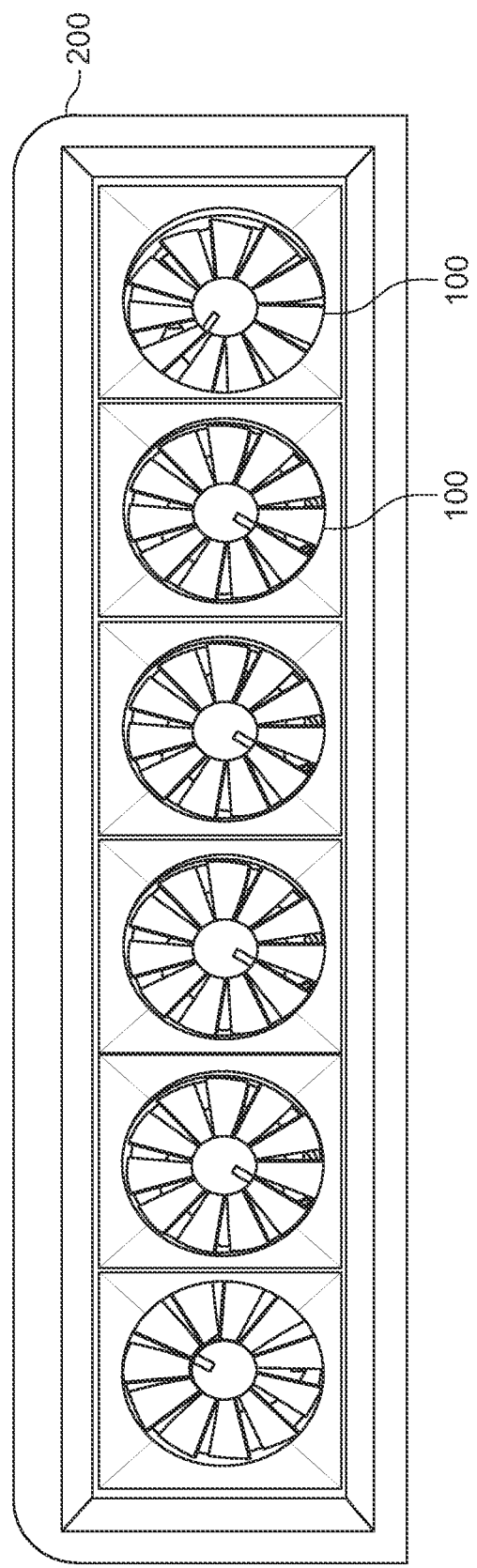
FIG. 3 is a front view, showing an example embodiment of the housing and the plurality of turbines according to the present disclosure.

In a highly preferred embodiment, with reference to the embodiment illustrated in FIG. 3, the present invention includes a plurality of turbines 100. Preferably, each of the plurality of turbines 100 is in electronic communication so that the entire plurality of turbines is connected in series. Connecting the turbines 100 in series includes any method of electronically connecting the turbines in which the total voltage difference across the plurality of turbines is the sum of the individual voltages of each of the plurality of turbines. In a preferred embodiment, the plurality of turbines 100 includes two or more turbines, or four or more turbines. In an exemplary embodiment, the plurality of turbines 100 includes six or more turbines.

Figure 2:
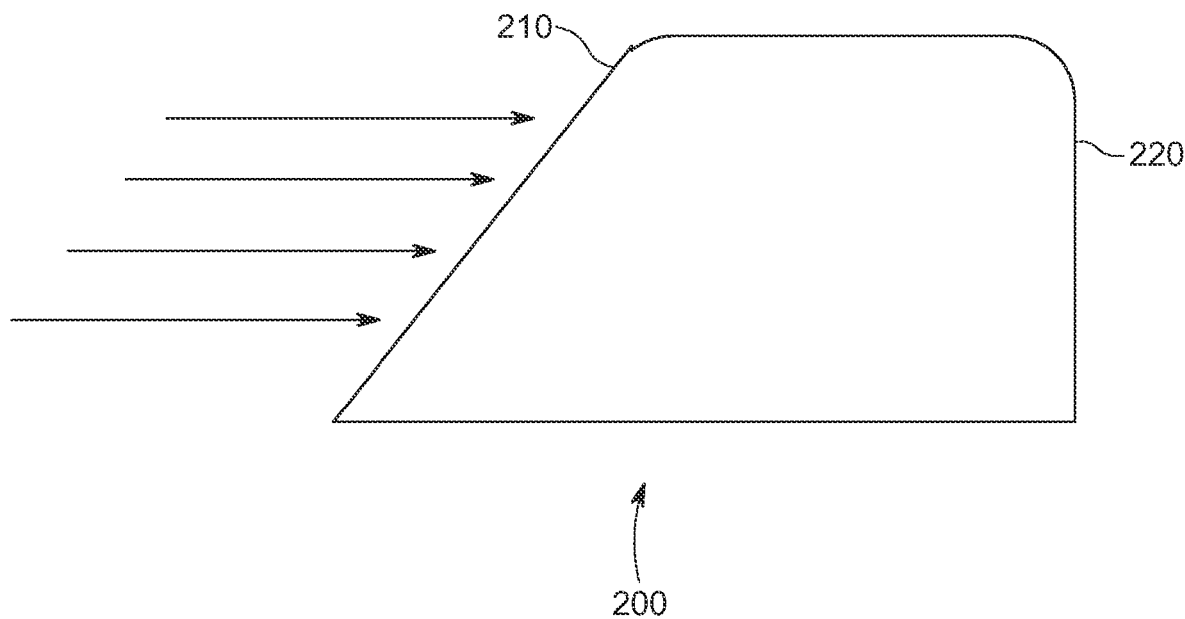
FIG. 2 is a side view, showing an example embodiment of the housing according to the present disclosure.

An embodiment of the present invention provides a housing 200 for directing airflow into a turbine 100 while a vehicle is in operation. With reference to the embodiment illustrated in FIG. 2, in some embodiments the housing 200 has a first end 210, with a first size, and a second end 220, with a second size. In a preferred embodiment, the first size is larger than the second size. However, in other embodiments, the first size and the second size may be the same, or the first size may be smaller than the second size. In an embodiment, the housing 200 is configured to increase the speed of airflow within the housing. In an embodiment, the housing 200 is configured to direct air towards the receiving end of the turbine 100, preferably the housing is configured to direct as much air as possible towards the receiving end of the turbine. In an embodiment, with reference to the embodiment illustrated in FIG. 2, the side profile of the housing 200 of the present invention may be circular, ovoid, square, rectangular, or a parallelogram in shape. In an embodiment, the side profile of the housing 200 of the present invention may be any shape necessary to direct as much air as possible towards the receiving end of the turbine. In an exemplary embodiment, the side profile of the housing 200 of the present invention is trapezoidal in shape.

With reference to the embodiment illustrated in FIG. 3, the housing 200 has one or more walls, such walls having both an exterior side and an interior side which faces the interior space of the housing. In a preferred embodiment, a cross-section of the front view of the housing 200 comprises four walls. In other embodiments, a cross-section of the front view of the housing 200 may also be circular, ovoid, rectangular, a parallelogram, or any other shape designed to facilitate airflow along the interior of the housing. A cross-section of the front view of an embodiment of the present invention has both a latitudinal and a longitudinal axis. In a preferred embodiment, the lengths of the latitudinal axis and the longitudinal axis are the same. In other embodiments, the lengths of the latitudinal axis and the longitudinal axis are different. In some embodiments, the housing 200 also has a vertical axis which runs along the interior space of the housing. In an embodiment, the housing 200 is designed so as to dampen vibrations and noise generated from the interior of the housing. In an embodiment, the interior of the housing 200 is lined with a material that insulates the housing from vibrations and noises generated from the interior of the housing. Such material for dampening vibrations and noises includes, but is not limited to, foams, rubbers, fabrics, fibers, tiles, plastics, composites, and other materials as would be understood by one of ordinary skill in the art as appropriate for this purpose.

In an embodiment, the housing 200 of the present invention is configured to direct airflow into the first end 210 of the housing, towards the receiving end of the turbine 100, out of the exhaust of the turbine 100, and finally out of the second end 220 of the housing. In a preferred embodiment, a cross-section of the back view of the housing 200 comprises four walls. In other embodiments, a cross-section of the back view of the housing 200 may also be circular, ovoid, rectangular, a parallelogram, or any other shape designed to facilitate airflow along the interior of the housing. A cross-section of the back view of an embodiment of the present invention has both a latitudinal and a longitudinal axis. In a preferred embodiment, the lengths of the latitudinal axis and the longitudinal axis are the same. In other embodiments, the lengths of the latitudinal axis and the longitudinal axis are different.

In sum, embodiments of the housing 200 of the present invention may be any three-dimensional shape that facilitate the flow of air into the receiving end of the turbine and out of the exhaust of the turbine. In an embodiment, the housing 200 is shaped like a cone. In an embodiment, the internal sides of the housing 200 are flat and taper from the first end to the second end linearly. However, in alternative embodiments the internal sides of the housing 200 are curved. In this alternative embodiment, the internal sides may be curved to resemble an exponential curve, logarithmic curve, or other curve. In further embodiments, the internal sides of the housing 200 are composed of two sections, a funnel section, tapering from the first end to the end of the funnel section linearly, and a collar section, with walls that do not taper and instead maintain a consistent cross-section diameter from the beginning of the collar section to the second end. In preferred embodiments, the housing 200 of the present invention is shaped to be a trapezoidal prism.

In further embodiments, a series of grooves are disposed onto the internal sides of the housing 200. In such an embodiment, the grooves may be milled into the housing 200 such that the grooves spiral from the first end to the second end. In another embodiment, any number of grooves are milled into the housing 200 such that the grooves are linear and extend from the first end to the second end. Alternatively, instead of removing material from the housing 200 like when milling grooves, material may be added to the housing. In such an embodiment material may be added to create the spiralling effect from the first end to the second end. Further, material may be added to create linear jetties extending from the first end to the second end. In either of these embodiments, the added material may either be easily removable or permanently fixed.

In some embodiments, the housing 200 is constructed from independent components that have been connected at each of the components ends by a means of fastening well known in the art. Connection methods include, but are not limited to, fastened by screw, bracket, adhesive, welding, or some other means of fastening. In alternative embodiments, the housing 200 is manufactured such that the housing is not originally independent components.

In an embodiment, the housing 200 is configured to be in communication with a surface of a vehicle 300. In an embodiment, the housing 200 is attached to the surface of a vehicle 300 through a means of connection. Connection methods include, but are not limited to, fastened by screw, bracket, adhesive, welding, or some other means of fastening. In an embodiment, the housing 200 is integrated into the surface of the vehicle 300. In an embodiment, the housing 200 rests upon the surface of the vehicle 300.

Figure 5:
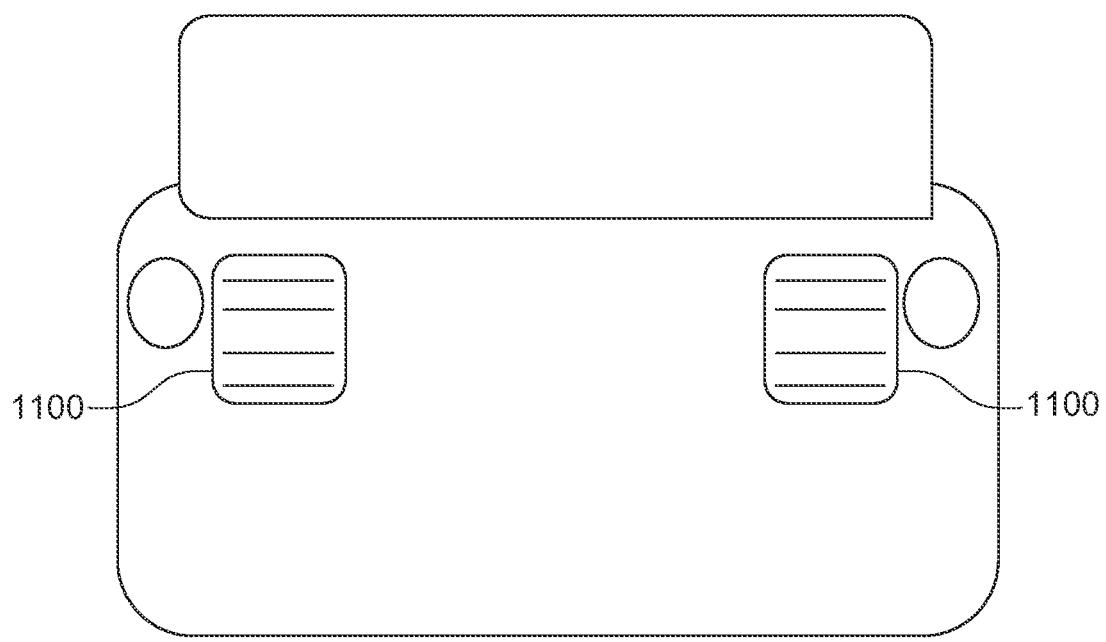
FIG. 5 is a front view of an alternate example embodiment of the turbine and housing according to the present disclosure.
Figure 6:
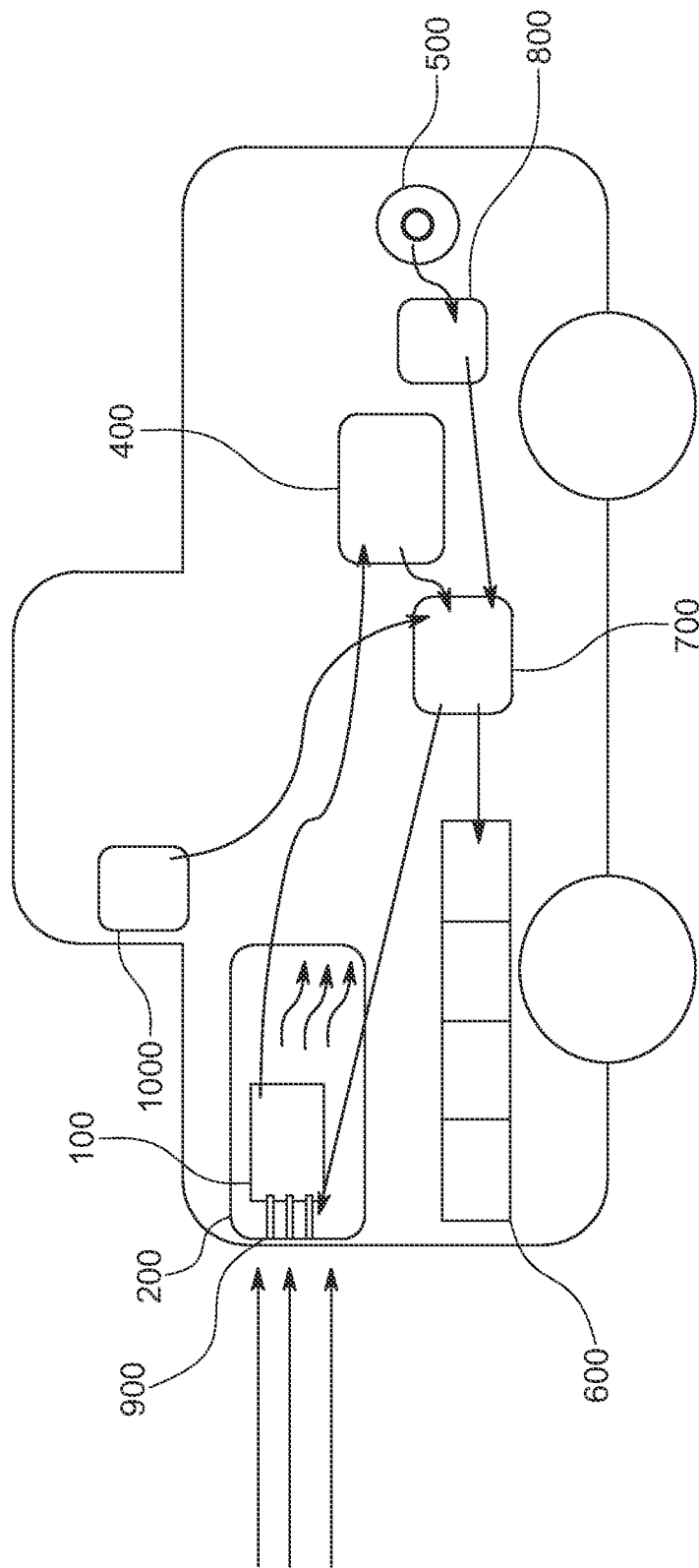
FIG. 6 is a cross sectional view, showing an alternate example embodiment of the housing, the turbine, the vehicle electrical system, the charge controller, the inverter, the system controller, the battery, and the system control panel according to the present disclosure.

In some alternate embodiments, with reference to the embodiments illustrated in FIGS. 5 and 6, the housing 200 may be contained within the vehicle, or an integral part of the vehicle. In an exemplary embodiment, the housing is integrated into the front of the vehicle, and receives airflow through the front grill 1100 of the vehicle and/or through grills designed into the front of the vehicle. In some embodiments, the housing 200 may be part of the vehicle body itself, such as where the vehicle is an electric vehicle with a front compartment, or where the vehicle is designed or modified to contain the present invention. In many embodiments where the housing 200 is integrated into the front of the vehicle, particularly those where the housing is contained within or is part of the vehicle body, the air entering the one or more turbines 100 is exhausted through side grills located on one or more of the sides of the vehicle. In an exemplary embodiment, one or more turbines 100 may be housed in separate housings 200 within the body of the vehicle, on each of opposite sides of the front of the vehicle.

In many embodiments, wind created by the moving vehicle, flows into specially designed funnel or housing where it is directed into the one or more turbines. As the speed of the vehicle increases, the wind speed increases, which translates to increased turbine rotation. Increased turbine rotation equals an increase in power production.

Figure 4:
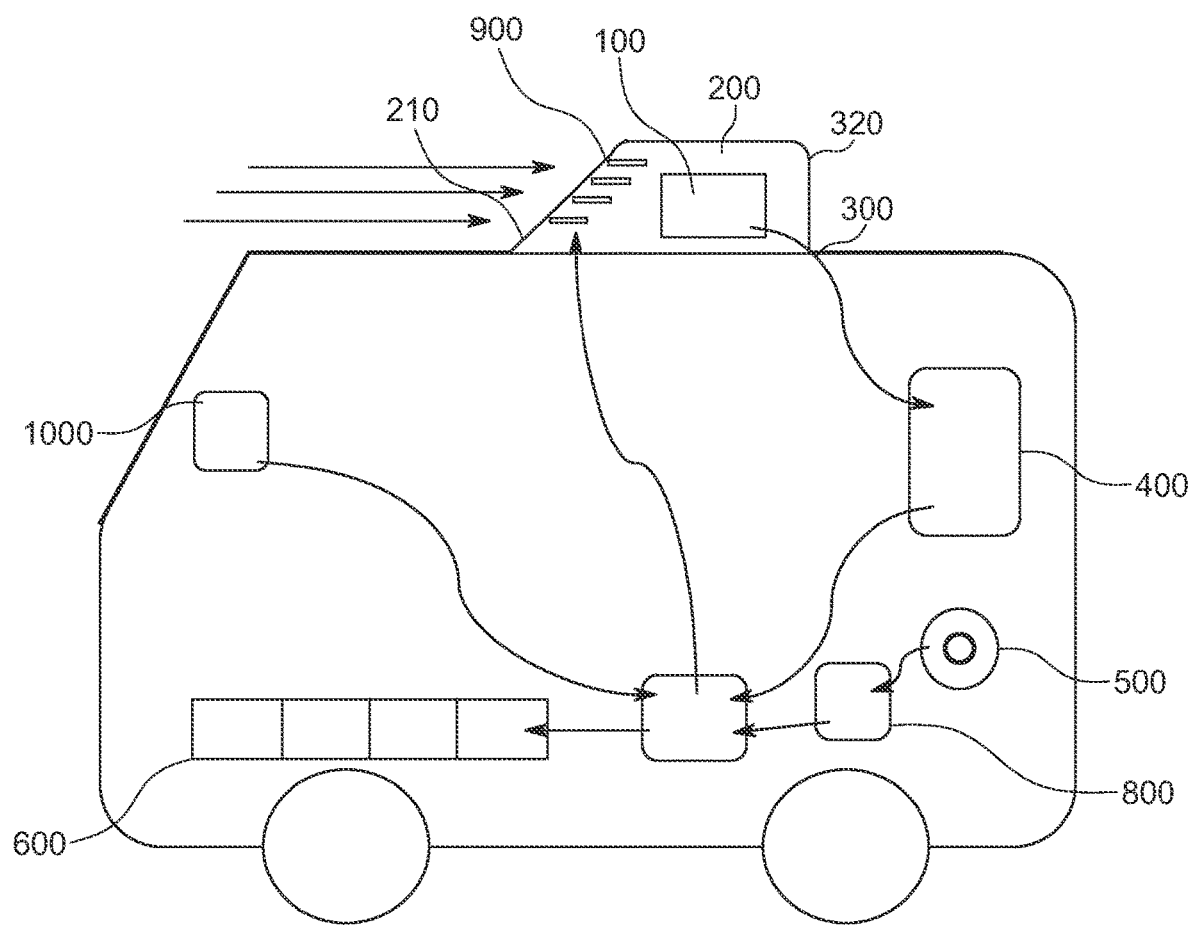
FIG. 4 is a cross sectional view, showing an example embodiment of the housing, the turbine, the vehicle electrical system, the charge controller, the inverter, the system controller, the battery, and the system control panel according to the present disclosure.

In an embodiment, with reference to the embodiments illustrated in FIGS. 4 and 6, the present invention includes a charge controller 400. In an embodiment, the charge controller 400 is in direct electronic communication with the turbine 100. In an embodiment the charge controller 400 is configured to smooth electric output from the turbine 100. Such smoothing of electric output includes, but is not limited to, smoothing of voltage fluctuation, prevention of reverse power flow, smoothing of voltage flicker, smoothing of the frequency of the electrical output, and any other forms of smoothing electrical output as would be appreciated by those of ordinary skill in the art, especially as pertains to the regulation of the electrical output of wind powered turbines.

In an embodiment, power produced by the turbine 100 is electrically transmitted to the charge controller 400, where the charger controller maximizes and controls current. The charge controller 400 acts as a safeguard so that one or more batteries 600 of the vehicle are not overcharged. In an embodiment, the charge controller 400 is in direct electronic communication with a charging port 500 of the vehicle. In an embodiment, the charge controller 400 is in direct electronic communication with one or more batteries 600 of the vehicle. In an embodiment, the charge controller 400 is configured to disconnect the turbine 100 from electronic communication with the charging port 500 while the vehicle is not in operation. In an embodiment, the charge controller 400 is configured to disable the plug-in charging functions of the charging port 500 while the vehicle is in operation.

In many embodiments, direct current ("DC") power generated by the one or more turbines 100 is directed to the charge controller 400. In some embodiments, the present invention includes a system controller 700, in electronic communication with the charge controller 400. Such system controller 700 is preferably a smart switch, connected to a drive module or other control system of the vehicle, more preferably also connected to other control systems of one or more of the vehicle and/or the present invention.

In an embodiment, with reference to the embodiments illustrated in FIGS. 4 and 6, the present invention includes an inverter 800. In an embodiment, current travels from the turbine 100 to the inverter 800. The inverter 800 converts the direct current ("DC") power from the turbine 100 into alternating current ("AC") power. In an embodiment, the inverter 800 is in direct electronic communication with the charge controller 400 and/or the system controller 700. In an embodiment, the inverter 800 is in direct electronic communication with a charging port 500 of the vehicle. In an exemplary embodiment, the inverter 800 and charge controller 400 are combined into a combination inverter and charge controller that exhibits the functions of both a charge controller and an inverter. In an embodiment, the combination inverter and charge controller is in direct electronic communication with both the turbine 100 and the charging port 500 of the vehicle. In an exemplary embodiment, the inverter 800 and system controller 700 are combined into a combination inverter and system controller that exhibits the functions of both a system controller and an inverter. In some embodiments, the inverter 800 is in electronic communication with the system controller 700, and is configured to convert AC power from the charging port 500 into DC power which is then fed to the system controller 700.

In some embodiments, with reference to the embodiments illustrated in FIGS. 4 and 6, the housing 200 and/or one or more turbines 100 includes a louvre or dampener system 900. Such louvre or dampener 900 preferably is configured to control airflow into the one or more turbines 100, such that the rotational speed of the one or more turbines 100 is controlled to prevent overspinning and/or other damage to the one or more turbines caused by excessive air flow or air speed.

In some embodiments, the system controller 700 is configured to detect whether the vehicle is in "Drive" or in "Park". In some embodiments, if the vehicle is in Park, the system controller 700 is configured to disable the DC power from the turbines 100 and enable AC power from the AC charging port 500 and the inverter 800 which changes power from AC to DC. In some embodiments, if the vehicle is in Drive, the system controller 700 is configured to disable the AC charging port 500 and enable the DC power from the turbines 100. In some embodiments, the system controller 700 will then send DC power to the vehicle batteries 600 to charge them. In some embodiments, the system controller 700 also controls the louvres or dampeners 900, preferably such that the louvres or dampeners 900 will open during lower vehicle speed, or close at higher vehicle speed to prevent the aforementioned issues regarding overspinning and the like.

In an embodiment, with reference to the embodiments illustrated in FIGS. 4 and 6, the present invention includes a system control panel 1000. In an embodiment, the system control panel 1000 is in direct electronic communication with the charge controller 400. In an embodiment, the system control panel 1000 provides information to a user about the status of the electric vehicle charging unit of the present invention. Preferably, such information includes, but is not limited to, the electrical output of the turbine 100, whether on a rate basis or in terms of total output, whether the electrical vehicle charging unit is in electronic communication with the vehicle, and whether the plug-in charging function of the charging port 500 is enabled.

In a preferred embodiment, the turbine 100 includes a brake that stops the rotation of the plurality of blades. Such a brake may be invoked when the incoming fluid or air reaches more than 150 miles per hour. However, in other embodiments, the brake may be set to different speed thresholds. In this embodiment, the turbine 100 includes a turbine controller that may start the at least one turbine at certain air speeds or initiate the brake at certain speed thresholds.

In other embodiments the turbine 100 includes a gear box, a low-speed shaft, and a high-speed shaft. Preferably, the gear box is disposed between a low-speed shaft and high-speed shaft. In preferable embodiments, the gear box contains one or more gears that are configured to increase rotational speed. In this embodiment, the high-speed shaft is further attached to the generator.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The disclosure is illustrated by example in the drawing figures, and throughout the written description. It should be understood that numerous variations are possible while adhering to the inventive concept. Such variations are contemplated as being a part of the present disclosure.

Example 1

An electric vehicle charging unit was built according to the present disclosure. In particular, a housing containing two turbines was built and was attached to the roof of a test vehicle, a Lexus RX.

The test vehicle with attached electric vehicle charging unit was driven at different speeds, on Dec. 20, 2020, under both road and highway conditions, to test the power generation of the electric vehicle charging unit under different conditions. The results are displayed in Table 1, below.

TABLE 1

| Vehicle Speed | Number of Turbines | Amps | Voltage | Watts to Batteries Unrectified |
|---|---|---|---|---|
| 15 | 2 | 1.55 | 62 | 96 |
| 20 | 2 | 1.90 | 85 | 161.5 |
| 25 | 2 | 2.40 | 99 | 237.6 |
| 30 | 2 | 2.45 | 123 | 301.35 |
| 40 | 2 | 2.95 | 169 | 498.55 |
| 50 | 2 | 3.10 | 186 | 576.6 |
| 60 | 2 | 3.29 | 224 | 737 |

Example 2

Two electric vehicle charging units were built according to the present disclosure. In particular, a first electric vehicle charging unit was built with a housing containing four turbines, and a second electric vehicle charging unit was built with a housing containing six turbines.

Each of the electric vehicle charging units were tested in a wind tunnel containing two speed controlled 12,800 cubic feet per minute (cfm) commercial fans, on Dec. 20, 2020. Each electric vehicle charging unit was tested at a variety of wind speeds in order to test the power generation with four, and six turbines per unit, respectively. The results are displayed in Table 2, below.

TABLE 2

| Vehicle Speed | Number of Turbines | Amps | Voltage | Watts to Batteries Unrectified |
|---|---|---|---|---|
| 15 | 4 | 1.75 | 149 | 260.75 |
| 15 | 6 | 1.75 | 237 | 414.75 |
| 20 | 4 | 2.20 | 199 | 437.8 |
| 20 | 6 | 2.20 | 298 | 655.6 |
| 25 | 4 | 2.70 | 237 | 640 |
| 25 | 6 | 2.70 | 358 | 966.6 |
| 30 | 4 | 2.88 | 291 | 838 |
| 30 | 6 | 2.88 | 427 | 1,229.76 |
| 40 | 4 | 3.25 | 390 | 1,267.50 |
| 40 | 6 | 3.25 | 575 | 1,868.75 |
| 50 | 4 | 3.40 | 488 | 1,659.20 |
| 50 | 6 | 3.40 | 730 | 2,482 |
| 60 | 4 | 3.58 | 590 | 2112.2 |
| 60 | 6 | 3.58 | 865 | 3096.7 |

What is claimed is:

1. An electric vehicle charging unit, comprising:
a turbine having a receiving end, an exhaust, and a rotatable shaft and a plurality of blades for generating electricity;
a housing having a first opening with a first size and a second opening with a second size, the housing being configured to direct airflow into the receiving end of the turbine, wherein the turbine is situated within the housing, wherein when the housing is on a surface of a vehicle, the turbine is in electronic communication with the electrical system of the vehicle; and
a charge controller and a system control panel, wherein the charge controller disconnects the electronic communication between the vehicle and the electrical vehicle charging unit when the vehicle is not in operation and disables a plug-in charging function of the electrical charging port of the vehicle when the vehicle is in operation, wherein the system control panel displays information regarding the electrical vehicle charging unit, including electrical output and whether the electrical vehicle charging unit is in electronic communication with the vehicle.

2. The electric vehicle charging unit of claim 1, wherein the first size of the housing is larger than the second size of the housing.

3. The electric vehicle charging unit of claim 1, wherein the housing is shaped to be a trapezoidal prism.

4. The electrical vehicle charging unit of claim 1, further comprising a controller, wherein the controller is in direct electronic communication with the turbine and is configured to smooth electrical output from the turbine.

5. The electrical vehicle charging unit of claim 1, further comprising an inverter.

6. The electrical vehicle charging unit of claim 5, wherein the inverter is in direct electronic communication with an electrical charging port of the vehicle.

7. The electrical vehicle charging unit of claim 1, further comprising a combination inverter and controller, wherein the combination inverter and controller is in direct electronic communication with the turbine and with an electrical charging port of the vehicle, and is configured to smooth electrical output from the turbine.

8. An electric vehicle charging unit, comprising:
a turbine having a receiving end, an exhaust, and a rotational means for generating electricity;
a housing having a first opening with a first size and a second opening with a second size, the housing being configured to direct airflow into the receiving end of the turbine, wherein the turbine is situated within the housing, wherein when the housing is in on a surface of a vehicle, the turbine is in electronic communication with an electrical system of the vehicle; and
a charge controller and a system control panel, wherein the charge controller disconnects the electronic communication between the vehicle and the electrical vehicle charging unit when the vehicle is not in operation and disables a plug-in charging function of the electrical charging port of the vehicle when the vehicle is in operation, wherein the system control panel displays information regarding the electrical vehicle charging unit, including electrical output and whether the electrical vehicle charging unit is in electronic communication with the vehicle.

9. The electric vehicle charging unit of claim 8, wherein the first size of the housing is larger than the second size of the housing.

10. The electric vehicle charging unit of claim 8, wherein the housing is shaped to be a trapezoidal prism.

11. The electrical vehicle charging unit of claim 8, further comprising a controller, wherein the controller is in direct electronic communication with the turbine and is configured to smooth electrical output from the turbine.

12. The electrical vehicle charging unit of claim 8, further comprising an inverter.

13. The electrical vehicle charging unit of claim 12, wherein the inverter is in direct electronic communication with an electrical charging port of the vehicle.

14. The electrical vehicle charging unit of claim 8, further comprising a combination inverter and controller, wherein the combination inverter and controller is in direct electronic communication with the turbine and with an electrical charging port of the vehicle, and is configured to smooth electrical output from the turbine.

* * * * *